United States Patent

[11] 3,625,597

[72] Inventor David P. Jones
 Detroit, Mich.
[21] Appl. No. 2,252
[22] Filed Jan. 12, 1970
[45] Patented Dec. 7, 1971
[73] Assignee Lee Radke Associates, Inc.
 Detroit, Mich.

[54] REMOTELY CONTROLLED DAY-NIGHT MIRROR ASSEMBLY
17 Claims, 4 Drawing Figs.

[52] U.S. Cl. .................................................. 350/281,
 74/501 M
[51] Int. Cl. ....................................................... G02b 7/18
[50] Field of Search ........................................ 350/279–282;
 74/501 M

[56] References Cited
 UNITED STATES PATENTS

| | | | |
|---|---|---|---|
| 3,253,508 | 5/1966 | Warhol ........................... | 350/281 |
| 3,369,427 | 2/1968 | Brighton et al. .............. | 74/501 M |
| 3,468,186 | 9/1969 | McIntyre ....................... | 74/501 M |
| 3,550,456 | 12/1970 | Pringle ......................... | 350/279 X |

*Primary Examiner*—John K. Corbin
*Attorney*—Barnard, McGlynn & Reising

ABSTRACT: An improved actuator means in a remotely controlled day-night mirror assembly including a movably supported mirror means having two reflecting surfaces of different reflecting power. The actuator means includes a generally cup-shaped housing with a primary actuating member supported for universal movement within the housing and a secondary actuating member supported in a semispherical cavity in the primary actuating member for movement relative to the primary actuating member between day and night positions and for moving with the primary actuating member when in either the day or night positions. The secondary actuating member is connected to the mirror by three push-pull remote control assemblies. A strip of metal defining a selector is attached to the secondary actuating member and extends through a slot in the primary actuating member and supports a knob on its distal end. By moving the knob from one end of the slot to the other, the secondary actuating member is moved between the day and night positions relative to the primary actuating member. When the knob is in either of the day or night positions, the primary actuating member may be moved to move the secondary actuating member thereby adjusting the position of the mirror.

REMOTELY CONTROLLED DAY-NIGHT MIRROR ASSEMBLY

This invention relates to a remotely controlled day-night mirror assembly of the type including a mirror movably supported on the exterior of a vehicle with motion transmitting means extending between the mirror and an actuator means disposed in an accessible position within the vehicle. Mirrors of this type are prismoidal having two reflecting surfaces of different reflecting power to provide a highly intense image during day driving and provide a dimmed image of reduced intensity for night driving when moved to a different angular position.

Such mirror assemblies are sometimes controlled by an actuator including a housing with a circular generally button-shaped actuating member universally supported in the housing and connected to the mirror through motion transmitting remote control assemblies. In order to provide for the adjustment of the mirror between day and night positions after it has been moved to the desired viewing position, an additional actuating lever movably supported by the housing adjacent the button-shaped actuating member is operatively connected to the mirror assembly through an additional motion transmitting remote control. In such an assembly, the mirror must be movably connected to a support which is in turn universally supported on the base so that major selected position of the mirror is determined by three push-pull control assemblies attached to the support member at one end and attached to the button-shaped actuating member at the other end and with the additional or auxiliary operating member operatively connected through an additional push-pull cable to the mirror for moving the mirror relative to the support between the day and night positions.

It is an object and feature of this invention to provide a remotely controlled day-night mirror assembly including an improved actuator means which is greatly simplified over the prior art assemblies in that it requires fewer components.

Accordingly, it is an object and feature of this invention to provide such a remotely controlled day-night mirror including support means, primary actuating means movably supported by the support means, secondary actuating means supported for movement relative to the primary actuating means between day and night positions and for moving with the primary actuating means when in the day and night positions, and motion transmitting means operatively interconnecting the mirror and the secondary actuating means whereby the mirror may be moved to a selected position by moving the primary actuating means to move the secondary actuating means and whereby the secondary actuating means may be moved independently of the primary actuating means between the day and night positions.

Other objects and attendant advantages of the present invention will be readily appreciated as the same becomes better understood by reference to the following detailed description when considered in connection with the accompanying drawings wherein:

FIG. 4 is a perspective view of the secondary actuating means and the selector means of the instant invention.

Referring now to the drawings wherein like numerals indicate like or corresponding parts, a preferred embodiment of a remotely controlled day-night mirror assembly constructed in accordance with the instant invention is generally shown at 10 in FIG. 1.

Figure 1:
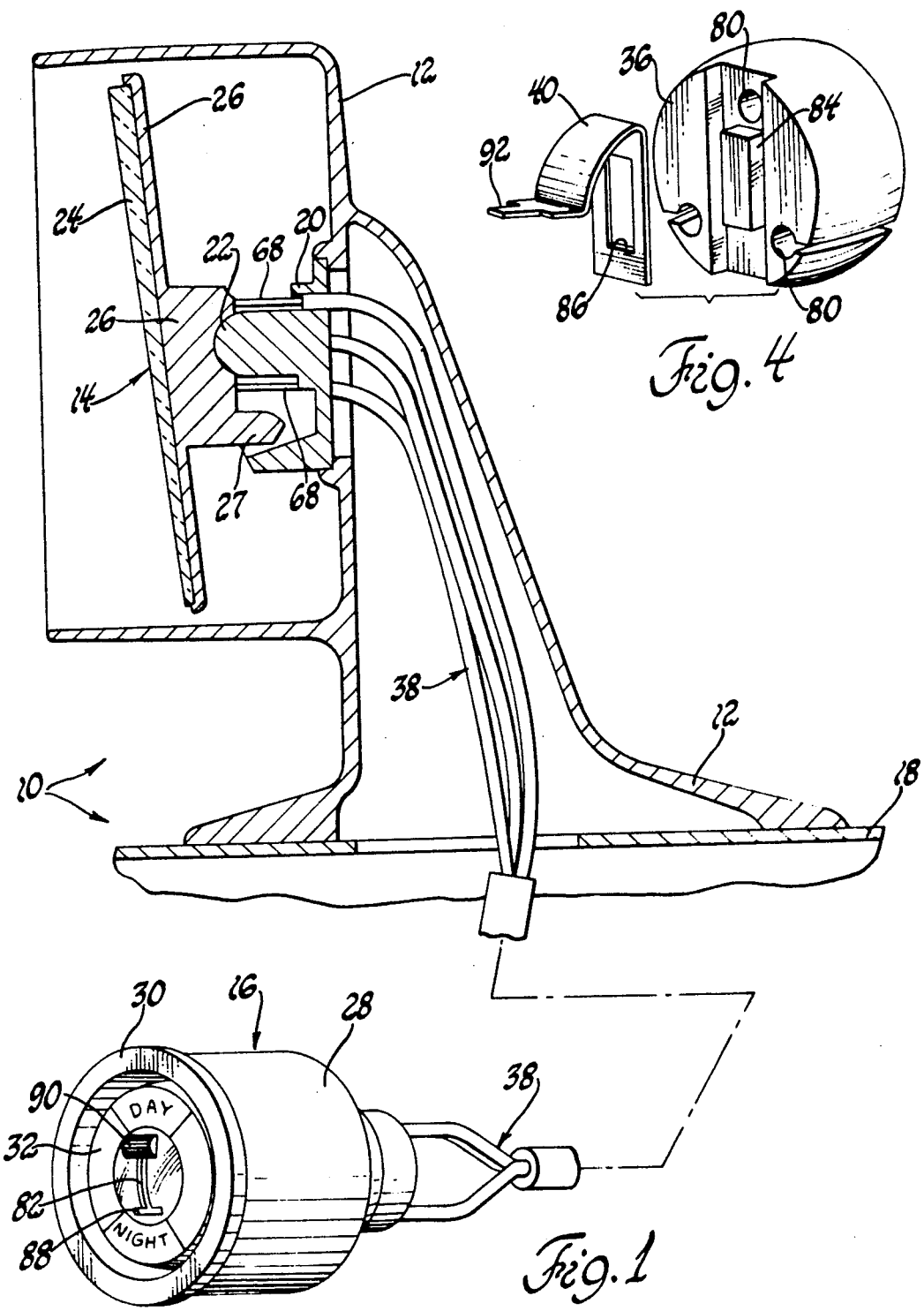
FIG. 1 is a view of a preferred embodiment of the instant invention showing the mirror and its associated base in cross section and showing the improved actuator means in perspective.

The assembly 10 includes a base 12, a mirror means generally indicated at 14 and removably supported by the base 12, and actuator means generally shown at 16.

The base 12 is attached to the wall 18 of a vehicle, such as the exterior wall of a fender or door. The base 12 is attached to the wall 18 by adhesive, bolts or other fastening means. The base 12 includes a member 20 which is secured thereto or may form an integral part thereof and which defines a projection 22 having a semispherical end surface.

The mirror means 14 includes a mirror 24 of the prismoidal type having two reflecting surfaces of different reflecting power and supported in a member 26. The member 26 has a female semispherical surface coacting with the projection 22 so that the mirror 24 is supported on the base for universal movement relative thereto. The support member 26 includes a projection 27 which extends into a cavity in the member 20 for preventing rotation of the mirror means 14.

The actuator means 16 is operatively connected to the mirror means 14 for adjusting the position of the mirror means 14 relative to the base 12.

The actuator means 16 includes a support means or housing 28. The housing 28 is circular and generally cup-shaped with a flange 30 about the outer periphery thereof at the open end. The housing 28 may be attached by an appropriate means to the interior of a vehicle. It is preferably recessed into a wall by being disposed in an opening therein and with the wall engaging the flange 36.

The actuator also includes a primary actuating means or member 32 which is movably supported by the housing 28 through a positioning means comprising the ring 34.

Figure 2:
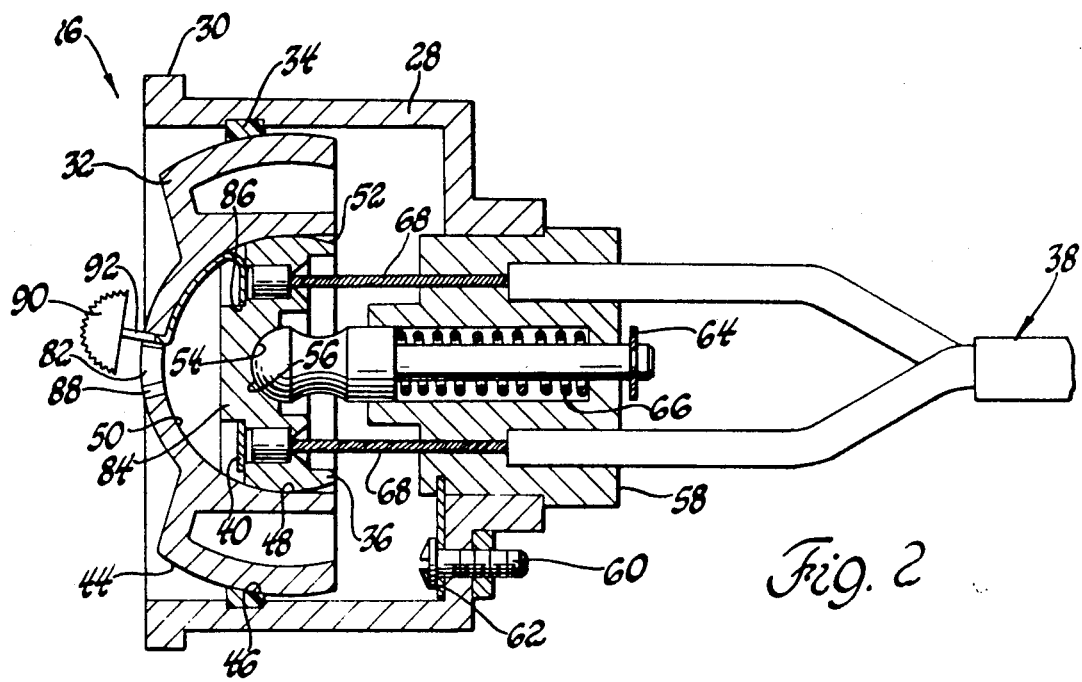
FIG. 2 is an enlarged fragmentary cross-sectional view of a preferred embodiment of the actuator means of the instant invention and in a position where the mirror is in the day position.
Figure 3:
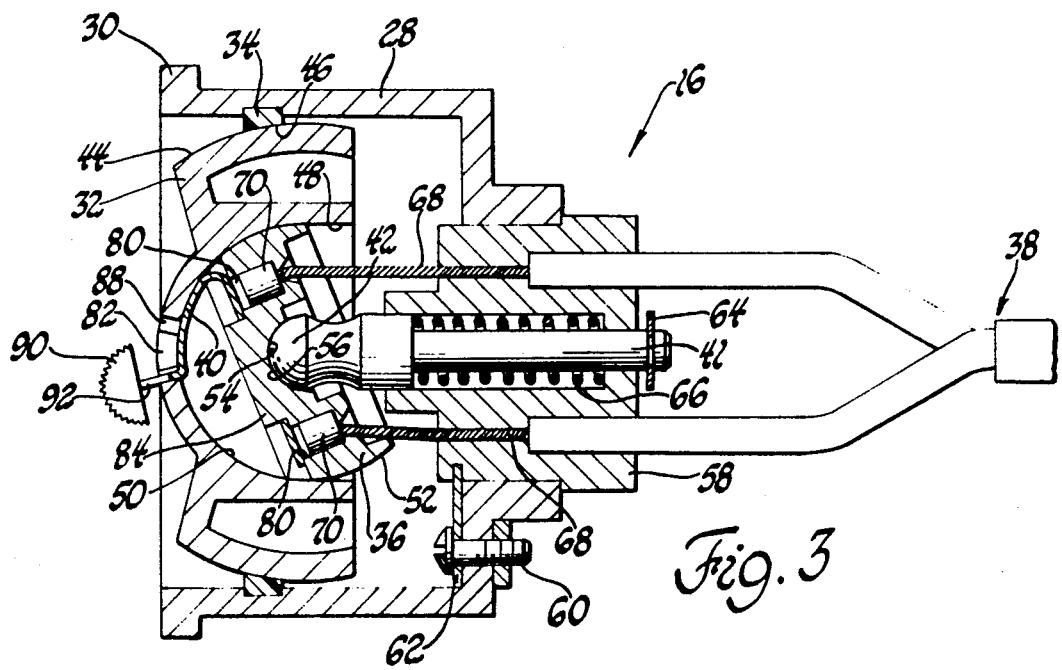
FIG. 3 is an enlarged fragmentary cross-sectional view similar to FIG. 2 but showing the components in the position where the mirror is in the night position.

Also included is a secondary actuating means or member 36 which is supported for movement relative to the primary actuating member 32 between a day position, as illustrated in FIG. 2, and a night position, as illustrated in FIG. 3, and also for moving with the primary actuating member 32 when in either of the day or night positions.

A motion transmitting means generally indicated at 38 operatively interconnects the mirror means 14 and the secondary actuating member 36 whereby the mirror means 14 may be moved to a selected position by moving the primary actuating member 32 which in turn moves the secondary actuating member 36 and whereby the secondary actuating member 36 may be moved independently of the primary actuating member 32 between the day and night positions to selectively present one of the two reflecting surfaces of the mirror 24.

The actuator means 16 also includes a selector means comprising the resilient metal strip 40 operatively interconnecting the primary and secondary actuating members 32 and 36 for moving the secondary actuating member 36 relative to the primary actuating member 32 between the day and night positions and for releaseably retaining the secondary actuating member 36 in either of the day or night positions.

The ring 34 and the primary actuating member 32 coact through mating semispherical surfaces, the primary and secondary actuating members 32 and 36 coact through mating semispherical surfaces, and the secondary actuating member 36 and the support means coact through mating semispherical surfaces. The support means or housing 28 includes universal means defined by the shaft 41 and the head 42 for supporting the secondary actuating member 36 for universal movement relative thereto and movement relative to the primary actuating member 32.

The primary actuating member 32 includes a first male semispherical outer surface 44 and the ring 34 presents a first female semispherical surface 46 in frictional sliding engagement with the male semispherical surface 44. Thus, the positioning means comprising the ring 34 supports the primary actuating member 32 for universal movement relative thereto and retains the primary actuating member 32 in any selected position to which it is moved. In other words, the friction between the surface 46 of the ring 34 and the surface 44 of the primary actuating member 32 is sufficient to maintain the primary actuating member 32 in any position to which it is moved. It will be understood, that instead of utilizing the ring 34, the housing 28 itself may have a female spherical surface for coacting with the male spherical surface 44 of the primary actuating member 32.

The primary actuating member 32 also includes a cavity 48 which presents a second female semispherical surface 50. The secondary actuating member 36 includes a second male semispherical surface 52 in sliding engagement with the second female semispherical surface 50 in the cavity 48.

The secondary actuating member 36 includes a third female semispherical surface 54 and the head 42 of the universal means includes a third male semispherical surface 56 in engagement with the third female semispherical surface 54. The secondary actuating member 36 is therefore supported for universal movement.

The housing 28 includes a member 58 which is prevented from rotating by the bolt 60 and clip 62. The shaft 41 is slidably supported in the member 58 and is retained therein by a snap ring 64. A biasing means comprising the spring 66 reacts between the member 58 of the support means and the head 42 for urging the head 42 into engagement with the primary actuating member 36. As a result thereof, the secondary actuating member 36 is in turn urged into engagement with the primary actuating member 32, which is in turn urged into engagement with the ring 34. The ring 34 prevents the primary actuating member 32 from moving out through the opening in the housing 28.

The motion transmitting means 38 comprises three push-pull assemblies each including a motion transmitting element 68 connected at a first end to the secondary actuating member 36 and connected at a second end to the support member 26 of the mirror means 14.

The first ends of the motion transmitting elements 68 have enlarged slugs 70 attached thereto and these slugs are disposed in holes 80 in the secondary actuating member 36. The slugs 70 may be disposed on the elements 68 after the elements 68 are inserted through the cavities 80 or, alternatively, the second actuating member 36 may have slots extending radially thereinto to allow the elements 68 to pass through the slots to a position where the slugs 70 may be moved into the holes 80.

The primary actuating member 32 includes an elongated slot 82 which extends therethrough from the cavity 48 to the exterior thereof. The second actuating member 32 includes a rectangular raised portion 84 and the metal resilient strip 40 has an opening 86 therein which is disposed about the projection 84 so as to be attached to the secondary actuating member 36. The metal strip 40 has an arcuate portion which is disposed along and engages the surface 50 within the primary actuating member 32. The metal strip 40 extends through the elongated slot 82 and there is included means at each end of the slot 82 for coacting with the metal strip 40 to retain the letter in the day and night positions respectively. More specifically, the means at each end of the elongated slot 82 comprise cross slots 88 and the strip 40 supports a knob 90 exteriorly of the primary actuating member 32. The strip 40 has a reduced width 92 extending to the knob 90 from a larger width which is wider than the elongated slot 82. Thus, the reduced width 82 may be moved along the elongated slot 82 in moving the secondary actuating member 36 between the day and night positions and the larger width of the strip 40 is disposed in the cross slots 88 for retaining the mirror in the day and night positions respectively. In other words, in moving the secondary actuating member 36 from the position illustrated in FIG. 2 to the position illustrated in FIG. 3, the knob 90 is depressed inwardly to move the enlarged width of the strip 40 out of the top slot 88 with the knob thereafter being forced downwardly to move the reduced width 92 of the strip 40 down through the slot 82 to the position where the larger width of the strip 40 will be biased outwardly by the resiliency of the strip 40 and into the lower slot 88, which position is illustrated in FIG. 3.

In the operation of the assembly therefore, the mirror assembly 14 may be moved to any selected position by moving the primary actuating member 32 which in turn moves the secondary actuating member 36 to move the motion transmitting elements 68. Once the mirror is in the selected position and it is desirable to move the mirror from the day position to the night position, the knob 90 is moved as described above from the position illustrated in FIG. 2 to the position illustrated in FIG. 3. During this movement the secondary actuating member 36 moves independently of the primary actuating member 32 to move the mirror between the day and night positions.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A remotely controlled day-night mirror assembly comprising; a base, mirror means having two reflecting surfaces of different reflecting power movably supported on said base; actuator means operatively connected to said mirror means for adjusting the position of said mirror means relative to said base, said actuator means including support means, primary actuating means movably supported by said support means, secondary actuating means supported for movement relative to said primary actuating means between day and night positions and for moving with said primary actuating means when in said day and night positions, and motion transmitting means operatively interconnecting said mirror means and said secondary actuating means whereby said mirror means may be moved to a selected position by moving said primary actuating means to move said secondary actuating means and whereby said secondary actuating means may be moved independently of said primary actuating means between said day and night positions to selectively present one of said two reflecting surfaces.

2. An assembly as set forth in claim 1 wherein said actuator means includes selector means operatively interconnecting said primary and secondary actuating means for moving said secondary actuating means relative to said primary actuating means between said day and night positions and for releasably retaining said secondary actuating means in said day and night positions.

3. An assembly as set forth in claim 2 wherein said support means includes positioning means supporting said primary actuating means for universal movement relative thereto and for retaining said primary actuating means in any selected position to which moved.

4. An assembly as set forth in claim 3 wherein said support means includes universal means supporting said secondary actuating means for universal movement relative thereto and movement relative to said primary actuating means.

5. An assembly as set forth in claim 4 wherein said motion transmitting means comprises three push-pull assemblies each including a motion transmitting element connected at a first end to said secondary actuating means and at the second end to said mirror means.

6. An assembly as set forth in claim 4 wherein said positioning means and said primary actuating means coact through mating semispherical surfaces, said primary and secondary actuating means coact through mating semispherical surfaces, and said secondary actuating means and said universal means coact through mating semispherical surfaces.

7. An assembly as set forth in claim 4 wherein said primary actuating means includes a slot extending therethrough, said selector means being attached to said secondary actuating means and extending through said slot and movable along said slot, and means at each end of said slot for coacting with said selector means to retain the latter in said day and night positions respectively.

8. An assembly as set forth in claim 4 wherein said primary actuating means includes a first male semispherical outer surface and said positioning means presents a first female semispherical surface in frictional sliding engagement with said male semispherical surface.

9. An assembly as set forth in claim 8 wherein said primary actuating means includes a cavity therein which presents a second female semispherical surface and said secondary actuating means includes a second male semispherical surface in sliding engagement with said second female semispherical surface in said cavity.

10. An assembly as set forth in claim 9 wherein said secondary actuating means includes a third female semispherical surface and said universal means includes a third male semispherical surface in engagement with said third female semispherical surface.

11. An assembly as set forth in claim 10 wherein said primary actuating means includes an elongated slot extending therethrough from said cavity, said selector means being attached to said secondary actuating means and extending through said slot and movable along said slot, and means at each end of said slot for coacting with said selector means to retain the latter in said day and night positions respectively.

12. An assembly as set forth in claim 11 wherein said means at each end of said elongated slot comprises a cross slot and said selector means comprises a resilient metal strip with a knob attached thereto exteriorly of said primary actuating means, said strip having a reduced width extending to said knob from a larger width which is wider than said elongated slot so that said reduced width may be moved along said elongated slot in moving said secondary actuating means between said day and night positions and said larger width disposed in said cross slots for retaining said secondary actuating means in said day and night positions respectively.

13. An assembly as set forth in claim 12 wherein said universal means comprises a shaft slidably supported by said support means and including an enlarged head presenting said third male semispherical surface, and biasing means reacting between said support means and said head for urging said head into engagement with said secondary actuating means and said secondary actuating means into engagement with said primary actuating means and said primary actuating means into engagement with said positioning means.

14. An assembly as set forth in claim 13 wherein said support means includes a circular generally cup-shaped housing with said primary actuating means and said knob of said selector means being accessible through the opening of said housing, said positioning means comprises a ring disposed in a groove in said housing.

15. An assembly as set forth in claim 14 wherein said motion transmitting means comprises three push-pull assemblies each including a motion transmitting element connected at a first end to said secondary actuating means and at the second end to said mirror means.

16. An actuator assembly of the type for remotely controlling a movably supported mirror of the type having two reflecting surfaces of different reflecting power, said assembly comprising; support means, primary actuating means movably supported by said support means, secondary actuating means supported for movement relative to said primary actuating means between day and night positions and for moving with said primary actuating means when in said day and night positions, said secondary actuating means including means for attachment to a motion transmitting means for operatively interconnecting a mirror and said secondary actuating means whereby the mirror may be moved to a selected position by moving said primary actuating means to move said secondary actuating means and whereby said secondary actuating means may be moved independently of said primary actuating means between said day and night positions to selectively present one of the two reflecting surfaces.

17. An assembly as set forth in claim 16 wherein said actuator means includes selector means operatively interconnecting said primary and secondary actuating means for moving said secondary actuating means relative to said primary actuating means between the day and night positions and for releasably retaining said secondary actuating means in said day and night positions.

* * * * *